(12) United States Patent
Ikeda

(10) Patent No.: US 8,743,437 B2
(45) Date of Patent: Jun. 3, 2014

(54) IMAGE PROCESSING APPARATUS, PRINTING APPARATUS AND IMAGE PROCESSING METHOD

(75) Inventor: Makoto Ikeda, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 327 days.

(21) Appl. No.: 13/250,632

(22) Filed: Sep. 30, 2011

(65) Prior Publication Data

US 2012/0086961 A1 Apr. 12, 2012

(30) Foreign Application Priority Data

Oct. 6, 2010 (JP) ................................ 2010-226730

(51) Int. Cl.
*G03F 3/08* (2006.01)
*G06K 9/00* (2006.01)

(52) U.S. Cl.
USPC ............ 358/518; 358/520; 358/521; 382/167

(58) Field of Classification Search
None
See application file for complete search history.

(56) References Cited

U.S. PATENT DOCUMENTS

| 6,034,788 | A * | 3/2000 | Sasanuma et al. | 358/406 |
|---|---|---|---|---|
| 6,204,873 | B1 * | 3/2001 | Shimazaki | 347/172 |
| 6,494,557 | B1 * | 12/2002 | Kato et al. | 347/19 |
| 6,690,490 | B1 * | 2/2004 | Murakami | 358/1.9 |
| 6,897,978 | B1 * | 5/2005 | Ohta | 358/1.9 |
| 8,121,499 | B2 * | 2/2012 | Fujiwara | 399/27 |
| 8,401,410 | B2 * | 3/2013 | Takura | 399/49 |
| 2008/0068682 | A1 * | 3/2008 | Morikawa | 358/521 |
| 2008/0143776 | A1 * | 6/2008 | Konno et al. | 347/19 |
| 2009/0141310 | A1 * | 6/2009 | Matsuoka | 358/3.06 |
| 2009/0220261 | A1 * | 9/2009 | Kubo et al. | 399/49 |
| 2009/0317149 | A1 * | 12/2009 | Takura | 399/301 |
| 2010/0060938 | A1 * | 3/2010 | Kondoh | 358/3.13 |
| 2010/0165367 | A1 * | 7/2010 | Nomura | 358/1.9 |
| 2010/0272453 | A1 * | 10/2010 | Fujiwara | 399/27 |
| 2011/0103811 | A1 * | 5/2011 | Tamaki | 399/40 |
| 2011/0141528 | A1 * | 6/2011 | Hirano et al. | 358/3.13 |
| 2012/0050771 | A1 * | 3/2012 | Sakatani | 358/1.9 |

FOREIGN PATENT DOCUMENTS

JP 2008-288968 11/2008

* cited by examiner

*Primary Examiner* — Madelein A Nguyen
(74) *Attorney, Agent, or Firm* — Buchanan Ingersoll Rooney PC

(57) ABSTRACT

Disclosed is an image processing apparatus that makes it possible to conduct an operation for correcting density unevenness in a main-scanning direction of an image, while achieving both the accuracy and the efficiency thereof. The image processing apparatus includes: an outputting section to output data representing a test chart including a plurality of patches respectively having different gradation values and extended in the main-scanning direction; an acquiring section to acquire a measured result of measuring a density of each of the patches included in the test chart printed on the basis of the data outputted by the outputting section; and a control section that compares the density unevenness of a pair of patches being adjacent to each other and deriving from the measured result, so as to determine new data representing a next patch to be outputted on a next occasion, based on a comparison result thereof.

9 Claims, 9 Drawing Sheets

IMAGE PROCESSING APPARATUS, PRINTING APPARATUS AND IMAGE PROCESSING METHOD

This application is based on Japanese Patent Application NO. 2010-226730 filed on Oct. 6, 2010, with Japan Patent Office, the entire content of which is hereby incorporated by reference.

BACKGROUND OF THE INVENTION

The present invention relates to an image processing apparatus, a printing apparatus and an image processing method, each of which is employed for outputting data representing a test chart to be used for an image quality correction processing.

In the printing apparatus, such as a printer, an MFP (Multi-Functional Peripheral), etc., in order to suppress the deterioration of an image quality of the printed image due to changes of printing characteristics caused by the degradation of the pans, the change of the parts, or another adverse factor, a patch image to be used for correcting the image quality of the printed image is printed in advance, so as to conduct the operation (calibration) in regard to the printing characteristics by measuring the image quality of the patch image printed.

For instance, Tokkai 2008-288968 (Japanese Patent Application Laid-Open Publication) sets forth such technology that the gamma characteristic (density gradation characteristic) is corrected so as to coincide the density represented by the image signal with the toner density of the image to be actually printed. Specifically, Tokkai 2008-288968 sets forth such the method that includes: printing the correction patch images including a plurality of gradation levels (such as 256 gradation levels, etc.); measuring brightness of each of the patch images so as to select sample points in regard to the plurality of gradation levels; arranging each of the sample points onto a brightness-gradation coordinate domain in the descending order or the ascending order of the gradation values; trying to detect an interval of an inflection point or an interval of a straight line from the intervals between the sample points; changing the interpolating method of the sample points corresponding to the detected results, so as to approximately acquire the consecutive gradation characteristic.

Further, since, sometimes, density unevenness would occur in the main-scanning direction of the printed image in the scanning-type printing apparatus, the operation for correcting the density unevenness in the main-scanning direction is also conducted. FIG. 9 shows a schematic diagram indicating an example of a conventional test chart 80 to be employed for measuring and correcting the density unevenness in the main-scanning direction.

In this case, since the density of the image is measured in the main-scanning direction, patch images 90, density of each of which is uniform (has a constant gradation value) over the printing range in the main-scanning direction. Further, in the configuration in which a plurality of image forming sections respectively corresponding to the primary colors of color Y (Yellow), color M (Magenta), color C (Cyan) and color K (Black), since, sometimes, the density unevenness of each of the primary colors in the main-scanning direction tends to differ from another one of the primary colors due to the differences between the parts employed in the image forming sections concerned, the patch images 90 are printed for every primary color. Still further, considering the gamma characteristic (density gradation characteristic) abovementioned, the patch images 90 corresponding to a plurality of gradation values are printed. For instance, eight patch images 90 are printed for every group of 32 gradation levels among the 256 gradation levels (input gradation levels of 0-255).

According to the abovementioned, in the test chart shown in FIG. 9, 32 patch images 90 ((4 colors of Y, M, C and K)×(8 patches)) are printed, so that the density unevenness of each of the patch images 90 in the main-scanning direction, which is printed on the test chart test chart 80, is measured, so as to calculate a correction value for correcting the density unevenness for every main-scanning position in regard to each of the colors of Y, M, C and K, based on the above-measured values. With respect to a correction value for a gradation level that has not been actually measured, the concerned correction value is found by conducting an interpolation arithmetic calculating operation, such as the linear interpolation processing, etc., from the measured correction values of the gradation levels.

(Deleted)

When the conventional test chart as abovementioned is employed, since the correction accuracy would be degraded in such a case that the number of patch images is too small, even if the linear interpolation processing is conducted, it is necessary to increase the number of patch images to some extent in order to secure the correction accuracy. However, the lager the number of patch images increases, the longer the time for measuring the density unevenness is required, resulting in an increase of consumptions of paper sheets and toner, and waste of time and materials.

SUMMARY OF THE INVENTION

To overcome the abovementioned drawbacks in conventional image processing apparatus, it is one of objects of the present invention to provide an image processing apparatus, a printing apparatus and an image processing method, each of which makes it possible to conduct an operation for correcting density unevenness in a main-scanning direction of an image, which is to be printed onto a recording medium, while achieving both the accuracy and the efficiency thereof.

Accordingly, at least one of the objects of the present invention can be attained by the image processing apparatuses, a printing apparatus and an image processing method described as follows.

(1) According to an image processing apparatus reflecting an aspect of the present invention, the image processing apparatus that outputs data representing a test chart to be used for measuring density unevenness in a main-scanning direction, which is included in an image printed by a printing apparatus, comprises: an outputting section to output the data representing the test chart that includes a plurality of patches respectively having gradation values, which are different from each other, and each of which is extended in the main-scanning direction; an acquiring section to acquire a measured result of measuring a density of each of the patches included in the test chart printed by the printing apparatus based on the data outputted by the outputting section; and a control section that compares in the main-scanning direction the density unevenness of a pair of patches being adjacent to each other among the plurality of patches, so as to determine new data representing a next patch to be outputted on a next occasion, based on a comparison result thereof wherein the density unevenness of the pair of patches are derived from the measured result acquired by the acquiring section.

(2) According to another aspect of the present invention, in the image processing apparatus recited in item 1, based on the comparison result, the control section changes a gradation value of at least one of the patches.

(3) According to still another aspect of the present invention, in the image processing apparatus recited in item 1, based on the comparison result, the control section changes a number of patches, to be included in the test chart.

(4) According to still another aspect of the present invention, in the image processing apparatus recited in item 1, when characteristic differences of the density unevenness in the main-scanning direction between any pair of patches included in the plurality of patches, whose gradation values are continuously adjacent to each other, fall within a first allowable range, the control section includes specific patches, a number of which is smaller than that of the plurality of patches, into next data representing a next test chart to be outputted on a next occasion, as patches representing a gradation range from a maximum to a minimum gradation values among the plurality of patches.

(5) According to still another aspect of the present invention, in the image processing apparatus recited in item 1, when characteristic differences of the density unevenness in the main-scanning direction between any pair of patches included in the plurality of patches, whose gradation values are adjacent to each other, exceed a second allowable range, the control section includes each of the patches, whose gradation levels are adjacent to each other, into next data representing a next test chart to be outputted on a next occasion.

(6) According to still another aspect of the present invention, in the image processing apparatus recited in item 1, when a characteristic difference of the density unevenness in the main-scanning direction between a pair of patches included in the plurality of patches, whose gradation values are adjacent to each other, exceeds a third allowable range, the control section adds a new patch, having such a gradation value that is an intermediate value between gradation values of the pair of patches, to next data representing a next test chart to be outputted on a next occasion.

(7) According to still another aspect of the present invention, in the image processing apparatus recited in item 4, the control section establishes one of the specific patches, the number of which is smaller than that of the plurality of patches, as such a patch that is located near to a center position within the gradation range from the maximum to the minimum gradation values.

(8) According to still another aspect of the present invention, in the image processing apparatus recited in item 4, the control section includes a patch, whose gradation value is located near to the minimum gradation value at a low density side, into the specific patches, the number of which is smaller than that of the plurality of patches.

(9) According to still another aspect of the present invention, in the image processing apparatus recited in item 4, the control section establishes the number of the specific patches, which is smaller than that of the plurality of patches, at one.

(10) According to still another aspect of the present invention, in the image processing apparatus recited in item 1, the control section limits the number of patches to be included in the test chart to such a number that is equal to or smaller than a constant numeral.

(11) According to still another aspect of the present invention, the image processing apparatus, recited in item 1, further comprises: a correcting section that finds a correction value for correcting the density unevenness in the main-scanning direction, based on the measured result acquired by the acquiring section, so as to employ the correction value to correct image data.

(12) According to a printing apparatus reflecting still another aspect of the present invention, the printing apparatus comprises: a printing section that repeatedly forms one line image in a main-scanning direction onto a recording medium while incrementally moving the recording medium in a sub-scanning direction being orthogonal to the main-scanning direction to sequentially sift a recording position of the one line image one by one, so as to form a two dimensional image onto the recording medium; and an image processing device to output data representing a test chart to be used for measuring density unevenness of the two dimensional image in the main-scanning direction, which is to be formed by the printing section; wherein the image processing device comprises: an outputting section to output the data representing the test chart that includes a plurality of patches respectively having gradation values, which are different from each other, and each of which is extended in the main-scanning direction; an acquiring section to acquire a measured result of measuring a density of each of the patches included in the test chart printed by the printing apparatus based on the data outputted by the outputting section; and a control section that compares in the main-scanning direction the density unevenness of a pair of patches being adjacent to each other among the plurality of patches, so as to determine new data representing a next patch to be outputted on a next occasion, based on a comparison result thereof wherein the density unevenness of the pair of patches are derived from the measured result acquired by the acquiring section.

(13) According to an image processing method reflecting yet another aspect of the present invention, the image processing method that is to be implemented in an information processing apparatus, comprises: outputting data representing a test chart to be used for measuring density unevenness in a main-scanning direction, which is included in an image printed by a printing apparatus, wherein the test chart includes a plurality of patches respectively having gradation values, which are different from each other, and each of which is kept constant in the main-scanning direction; acquiring a measured result of measuring a density of each of the patches included in the test chart printed by the printing apparatus based on the data outputted in the outputting step; comparing in the main-scanning direction the density unevenness of a pair of patches being adjacent to each other among the plurality of patches, wherein the density unevenness of the pair of patches are derived from the measured result acquired in the acquiring step; and changing a patch whose data is to be included in new data of a next test chart to be outputted on a next occasion, based on a comparison result outputted in the comparing step.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
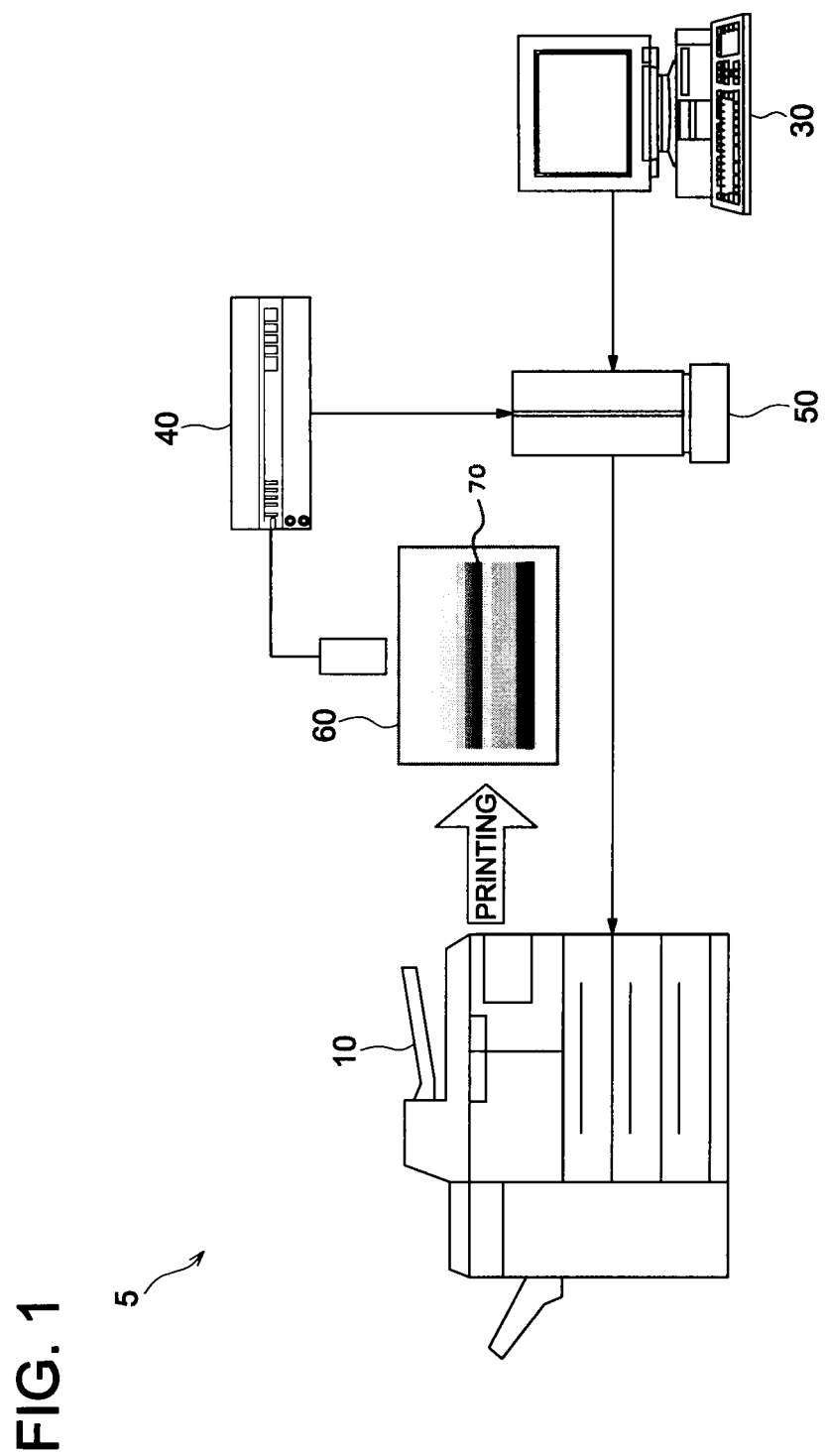
FIG. 1 shows a schematic diagram indicating an exemplary configuration of an image processing system embodied in the present invention.

Referring to the drawings, the embodiment of the present invention will be detailed in the following.

FIG. 1 shows a schematic diagram indicating an exemplary configuration of an image processing system 5 embodied in the present invention. The image processing system 5 is constituted by a printing apparatus 10, a terminal device 30, a measuring apparatus 40 and an image processing apparatus 50, which are coupled to each other. In the present embodiment, the printing apparatus 10 is coupled to the image processing apparatus 50 through a cable, while, the terminal device 30 and the measuring apparatus 40 are coupled to the image processing apparatus 50 through other cables, respectively.

The printing apparatus 10 serves as a printer or an MFP (Multi-Functional Peripheral), etc., which is provided with a function for printing an image onto a recording medium so as to output the image-printed recording medium. The printing apparatus 10, embodied in the present invention, serves as the MFP (Multi-Functional Peripherals) that is provided with functions for implementing various kinds of jobs, including a copy job for optically reading an image residing on a document and printing the reproduced image thereof onto the recording medium; a scanning job for storing image data, read from the document, therein as a file, and/or transmitting the image data to an external apparatus; a printing job for printing an image represented by the image data, received from the terminal device 30 through the image processing apparatus 50, onto the recording medium, so as to output the image-printed recording medium; etc. The printing operation is performed in such a manner that a line image corresponding to one main-scanning line is repeatedly formed onto the recording medium while sequentially shifting the recording position of the line image in the sub-scanning direction orthogonal to the main-scanning direction, so as to achieve a formation of the two-dimensional image onto the recording medium.

In addition to the abovementioned, the printing apparatus 10 is also provided with such a function for printing and outputting a test chart 60 to be used for measuring and correcting the density unevenness in the main-scanning direction when printing the image onto the recording medium. In the test chart 60, plural patch images 70, each of which is used for measuring the density unevenness in the main-scanning direction, are printed onto the recording medium, in such a manner that the patch images 70 are located at positions being adjacent to each other. The image data, representing the test chart 60 including the plural patch images 70 concerned, is inputted from the image processing apparatus 50.

The terminal device 30 is provided with a function for transmitting a print job to the printing apparatus 10 through the image processing apparatus 50 to request the implementation of the print job concerned. The terminal device 30 is constituted by a personal computer into which various kinds of programs, such as an OS (Operating System) program, a driver program for driving the printing apparatus 10, application programs for creating and editing various kinds of documents and images, etc., are installed, etc. A CPU (Central Processing Unit) of the personal computer executes the driver program for driving the printing apparatus 10, so as to request the printing apparatus 10 to conduct various kinds of operations, such as an operation for transmitting the print job, another operation for implementing the print job, etc.

The measuring apparatus 40 is provided with a function for measuring the density (color) of the image printed onto the recording medium, so as to output the measured data serving as the result of the abovementioned measuring operation. In the present embodiment, the measuring apparatus 40 measures density unevenness of the plural patch images 70 printed onto the test chart 60 in the main-scanning direction, to output the measured data to the image processing apparatus 50. The measuring apparatus 40 is constituted by a general purpose measuring apparatus (spectrum analyzer) that disperses the light reflected from the image concerned, so as to measure a spectral reflectivity for every spectral wavelength, and calculates and outputs tristimulus values X, Y, Z by employing a predetermined calculating method; etc.

The image processing apparatus 50 is provided with functions for comparing density unevenness of a pair of patch images 70, which are located at positions adjacent to each other within the test chart 60, with each other, based on the measured data inputted from the measuring apparatus 40; and then, determining patch images 70 to be included into the test chart, which is to be printed by the printing apparatus 10 next to the abovementioned pair of patch images 70, based on the comparison result above-measured; and outputting image data representing the test chart 60 including the above-determined patch images 70. Further, the image processing apparatus 50 is also provided with a function for finding a correction value for correcting the density unevenness in the main-scanning direction so as to employ the correction value for correcting the print data (image data) inputted from the terminal device 30, and outputting the corrected print data to the printing apparatus 10. The image processing apparatus 50 is constituted by a printer controller that is provided with the above-mentioned functions, including the function serving as a correction value calculating section, the other function serving as a correction value storing section and still the other function serving as a correction value processing section; etc.

Figure 2:
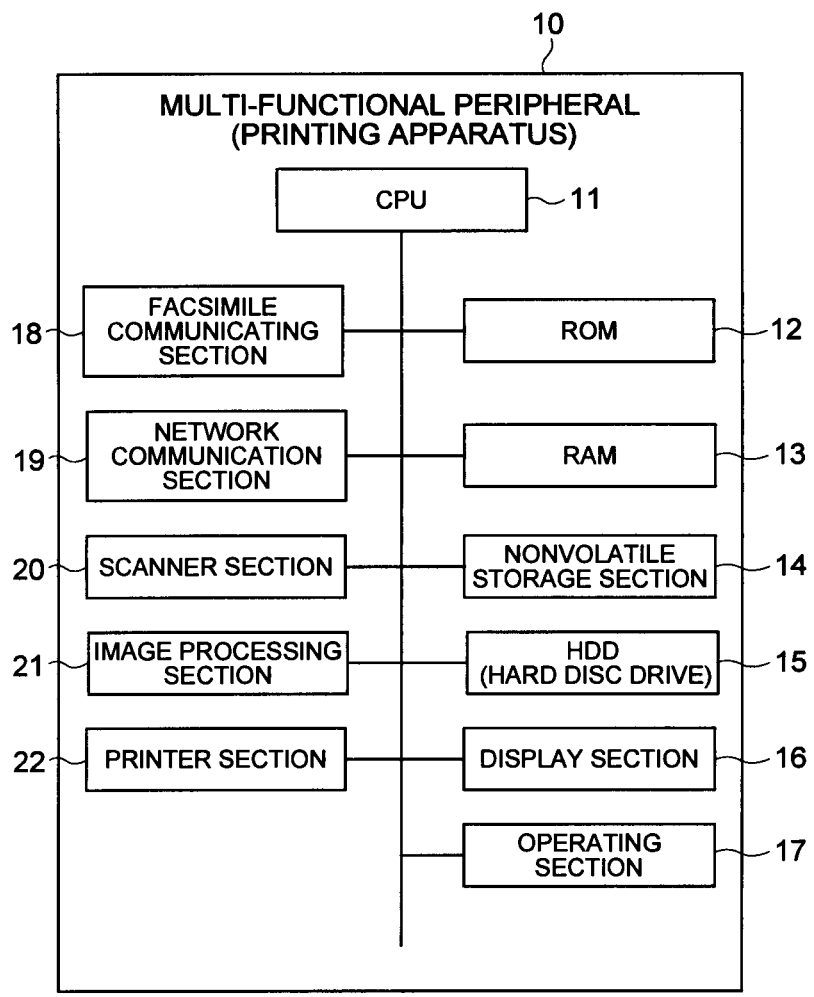
FIG. 2 shows a block diagram indicating a rough configuration of a printing apparatus embodied in the present invention.

FIG. 2 shows a block diagram indicating a rough configuration of the printing apparatus 10. The printing apparatus 10 is constituted by a CPU (Central Processing Unit) 11 to conduct overall controlling operations for controlling various kinds of operations to be performed in the printing apparatus 10 concerned; a ROM (Read Only Memory) 12 coupled to the CPU 11; a RAM (Random Access Memory) 13; a nonvolatile storage section 14; an HDD (Hard Disc Drive) 15; a display section 16; an operating section 17; a facsimile communicating section 18; a network communication section 19; a scanner section 20; an image processing section 21; and a printer section 22, which are coupled to each other through a bus extended from the CPU 11.

In the printing apparatus 10, the OS program serves as a boot program, so that the CPU 11 can execute various kinds of programs, such as middleware programs, application programs, etc., on the OS program. The ROM 12 stores various kinds of programs, therein, and the CPU 11 executes the various kinds of programs as needed, so as to implement each of the functions (operations) provided in the printing apparatus 10, such as the operation for implementing the print job, etc. The RAM 13 serves as a working memory for temporarily storing various kinds of data when the CPU 11 executes a program, an image data storage for temporarily storing image data, etc. In this connection, necessary programs, other than the above, are loaded into the RAM 13 the HDD 15 and executed by the CPU 11.

The nonvolatile storage section 14 serves as a rewritable storage (flash memory) that retains stored data as it is, even if the power source thereof is turned OFF. The nonvolatile storage section 14 stores information inherent to the apparatus concerned, various kinds of setting information, etc., therein. The HDD 15 serves as a nonvolatile mass storage device, into which the OS program, various kinds of application programs, print data, image data, job history information, etc. are stored.

The printing apparatus 10 is constituted by the display section 16 and operating section 17. The display section 16 is provided with an LCD (Liquid Crystal Display), etc., so as to display various kinds of screens, such as an initial screen, an operating screen, a setting screen, etc., thereon. The operating section 17 accepts various kinds of user's operations for inputting a job, setting the inputted job, etc. Other than the touch panel mounted over the screen of the display section 16 to detect a coordinate position depressed by the user, the operating section 17 is further provided with a ten key, character inputting keys, a start key, etc.

The facsimile communicating section 18 transmits and receives image data to/from an external apparatus, provided with a facsimile function, through the public telephone line. The network communication section 19 conducts operations for communicating with the image processing apparatus 50 coupled to the printing apparatus 10 through the communication cable, the other external apparatus coupled to the printing apparatus 10 through the network, such as LAN (Local Area Network), etc., etc.

The scanner section 20 optically reads the image residing on the document to acquire the image data thereof. For instance, the scanner section 20 is constituted by a light source to emit light to be irradiated onto the document; a line image sensor that receives the light reflected from the document so as to read the one line image of the document in its width direction; a document moving mechanism that moves the document in its longitudinal direction so as to sequentially shift the document reading position in a unit of the scanning line; an optical system that is constituted by various kinds of optical elements, such as a lens, a mirror, etc., to guide the light reflected from the document to the line image sensor so as to focus the light thereon; an analogue-to-digital converting section to convert the analogue signals, outputted by the line image sensor, to the digital image data; etc.

The image processing section 21 applies various kinds of image processing, such as a rasterizing processing for converting print data to image data, image correction processing, an image rotation processing, an image size enlargement/reduction processing, a data size compression/expansion processing, etc., to the image data.

The printer section 22 forms the image (color image) based on the image data onto the recording medium through the electro-photographic process and outputs the recording medium bearing the image above-formed. For instance, the printer section 22 serves as, so called, a laser printer (color laser printer) that is constituted by: a conveyance mechanism for conveying the recording medium; a photoreceptor drum; a charging device; an LD (Laser Diode) to emits a laser beam, intensity of which is modulated on the basis of the image data inputted; a scanning unit that is provided with a polygon mirror to scan the laser beam, emitted from the LD, onto the circumferential surface of the photoreceptor drum; a developing device; a transferring separation device; a cleaning device; and a fixing device. Further, the printer section 22 includes the plural image forming sections, each of which is provided with the photoreceptor drum, the charging device, the developing device, etc., and which are respectively correspond to color Y (Yellow), color M (Magenta), color C (Cyan) and color K (Black), serving as primary colors for forming a full color image. In this connection, an LED (Light Emitting Diode) printer that irradiates light emitted by the LEDs onto the photoreceptor drum, instead of scanning the laser beam, or any other printer that employs another image forming method, is also applicable as the printer section 22 of the present invention.

Figure 3:
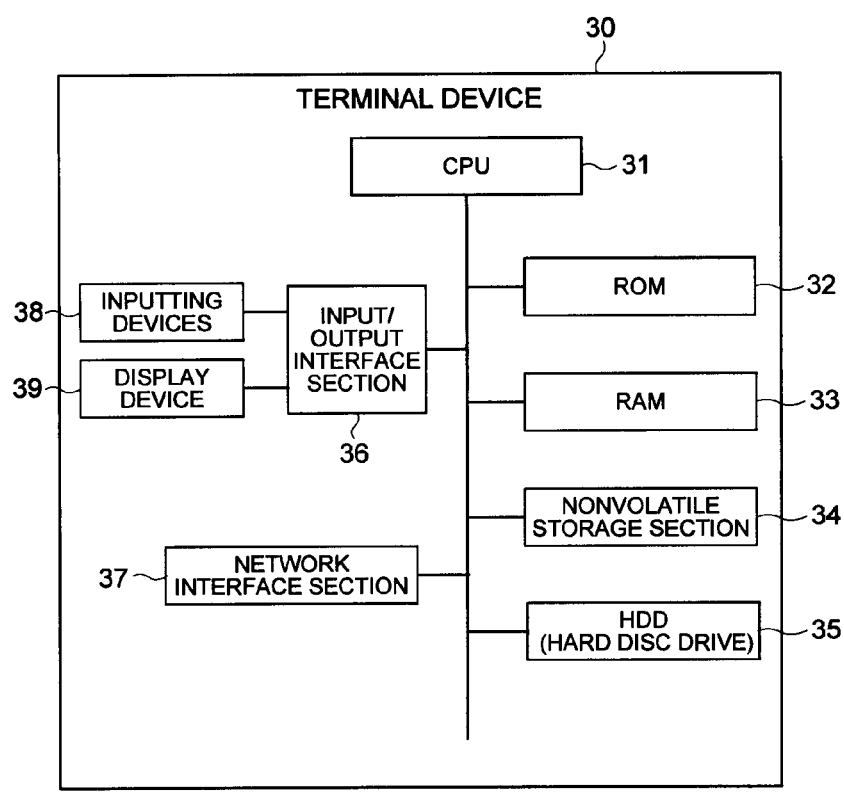
FIG. 3 shows a block diagram indicating a rough configuration of a terminal device embodied in the present invention.

FIG. 3 shows a block diagram indicating a rough configuration of the terminal device 30. The terminal device 30 is constituted by a CPU (Central Processing Unit) 31, a ROM (Read Only Memory) 32, a RAM (Random Access Memory) 33, a nonvolatile storage section 34, an HDD (Hard Disc Drive) 35, and an input/output interface section 36 and a network interface section 37, which are coupled to each other through a bus extended from the CPU 31. Further, various kinds of inputting devices 38, such as a keyboard, a mouse, etc., and a display device 39, such as an LCD (Liquid Crystal Display), etc., are coupled to the terminal device 30 through the input/output interface section 36.

The CPU 31 executes various kinds of programs stored in the ROM 32 as needed, so as to control operations to be conducted in the terminal device 30 and executes various kinds of application programs stored in the HDD 35 as needed, so as to implement various kinds of processing. The ROM 32 stores the boot program and/or various kinds of default data, therein. The RAM 33 stores programs currently read out from the HDD 35, therein. Further, the RAM 33 also serves as a working memory into which various kinds of data are temporarily stored when the CPU 31 executes the programs concerned.

The nonvolatile storage section 34 serves as a rewritable storage that retains stored data as it is, even if the power source thereof is turned OFF. The nonvolatile storage section 14 stores system information of the terminal device 30 concerned, various kinds of setting information, etc., therein. The HDD 35 serves as a nonvolatile mass storage device, into which the OS program, various kinds of application programs, files, data, etc. are stored. The network interface section 37 serves as a communication interface for communicating with the image processing apparatus 50 through the cable.

Figure 4:
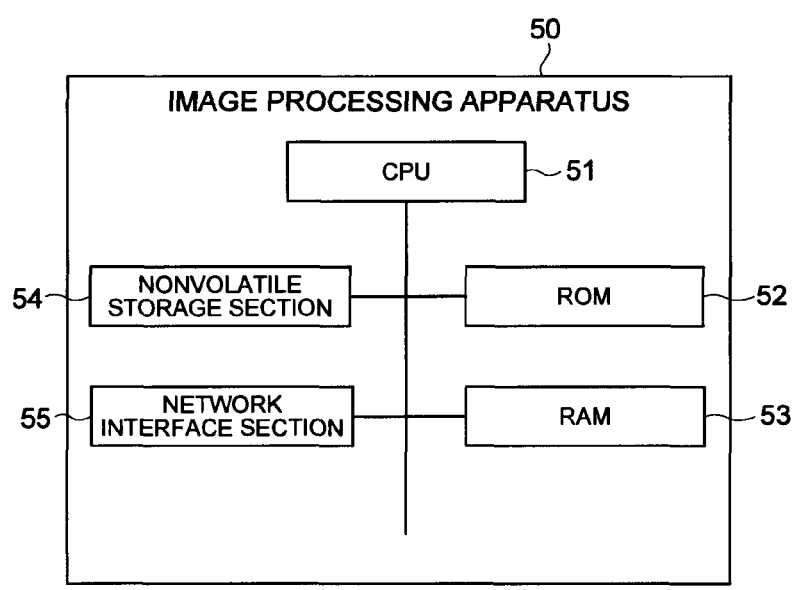
FIG. 4 shows a block diagram indicating a rough configuration of an image processing apparatus embodied in the present invention.

FIG. 4 shows a block diagram indicating a rough configuration of the image processing apparatus 50. The image processing apparatus 50 is constituted by a CPU (Central Processing Unit) 51, a ROM (Read Only Memory) 52, a RAM (Random Access Memory) 53, a nonvolatile storage section 54 and a network interface section 55.

The CPU 51 totally controls the operations to be conducted in the image processing apparatus 50. The ROM 52 stores programs to be executed by the CPU 51 and default data, therein. The RAM 53 serves as a working memory for the CPU 51, or the like. The nonvolatile storage section 54 stores various kinds of setting data, image data representing the test chart 60, measured data inputted from the measuring apparatus 40, correction values for correcting the density unevenness in the main-scanning direction in regard to print data (image data) to be transmitted to the printing apparatus 10 through the image processing apparatus 50 concerned, etc., therein, in the nonvolatile manner.

Next, the test chart 60 will be detailed in the following.

The density unevenness in the main-scanning direction, which is generated in the image printed by the printing apparatus 10, is mainly caused by the factors described as follows.
1) Factor 1: toner density on the photoreceptor drum is inclined due to the inclination of the electrode electric potential caused by the charging device.
2) Factor 2: toner density on the photoreceptor drum is inclined due to differences between reflectance ratios of the polygon mirrors, which are to be generated in the main-scanning direction.

The density unevenness in the main-scanning direction includes the following characteristics due to the abovementioned factors.

The density inclinations of unicolor images of color Y (Yellow), color M (Magenta), color C (Cyan) and color K (Black) for forming a full color image, are different from each other. • • • due to the Factor 1, etc.

With respect to the density unevenness for every gradation, a specific gradation exhibits a tendency similar to that of another gradation having a value approximate to that of the specific gradation. In this connection, the abovementioned term of the "tendency" represents a place at which the density unevenness is generated in the main-scanning direction and a degree of the density unevenness.

Herein in the present embodiment, according to characteristic abovementioned, the patch images, having gradation values that exhibit the similar tendency, are integrated for every color, so as to reduce the number of the patch images. Concretely speaking, at first time the printing apparatus 10 is made to print a default simple test chart in which a number of patch images is smaller than that of the conventional test chart. Successively, by employing the default simple test chart, the operations for measuring and correcting the density unevenness in the main-scanning direction are conducted in the printing apparatus 10. At the next time or the following time, based on the results of measuring the density unevenness in the main-scanning direction while employing the simple test chart employed at the previous time, the patch images to be included in the current test chart are determined. According to the abovementioned, it is possible to update the number of patch images to be included in the simple test chart, corresponding to the change of the tendency of the density unevenness in the main-scanning direction in the printing apparatus 10, and accordingly, it becomes possible to appropriately correct the density unevenness in the main-scanning direction.

Figure 5:
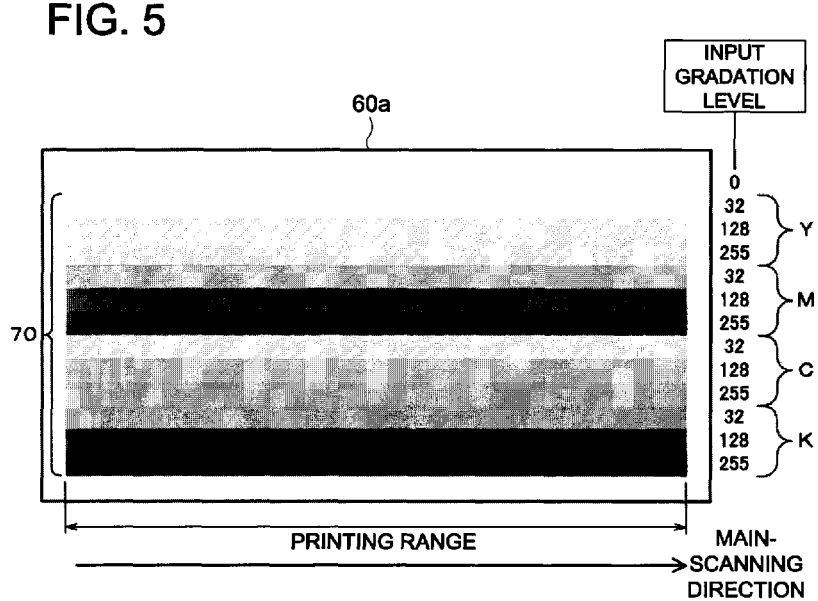
FIG. 5 shows a schematic diagram indicating an example of a default simple test chart embodied in the present invention.

It is preferable that the gradation values of each of the colors are uniformly arranged in the default simple test chart. FIG. 5 shows a schematic diagram indicating an example of a default simple test chart 60a in which the gradation values of each of the colors are uniformly arranged.

In the simple test chart 60a shown in FIG. 5, the three patch images 70 corresponding to 32, 128 and 255 gradation levels among 256 gradation levels (input gradation levels 0-255) are printed for each of colors Y, M, C and K. Accordingly, in this exemplified simple test chart 60a, 12 patch images 70 ((4 colors of Y, M, C and K)×(3 patches)) are printed. In this connection, since the density of the image is measured in the main-scanning direction, each of the patch images 70 is printed in such a manner that the density of the printed image is kept constant (keeping the gradation value constant) all over the printing range in the main-scanning direction. Further, the patch images are arranged from upper to lower in ascending order of gradation values, and are printed at positions being adjacent to each other.

Figure 9:
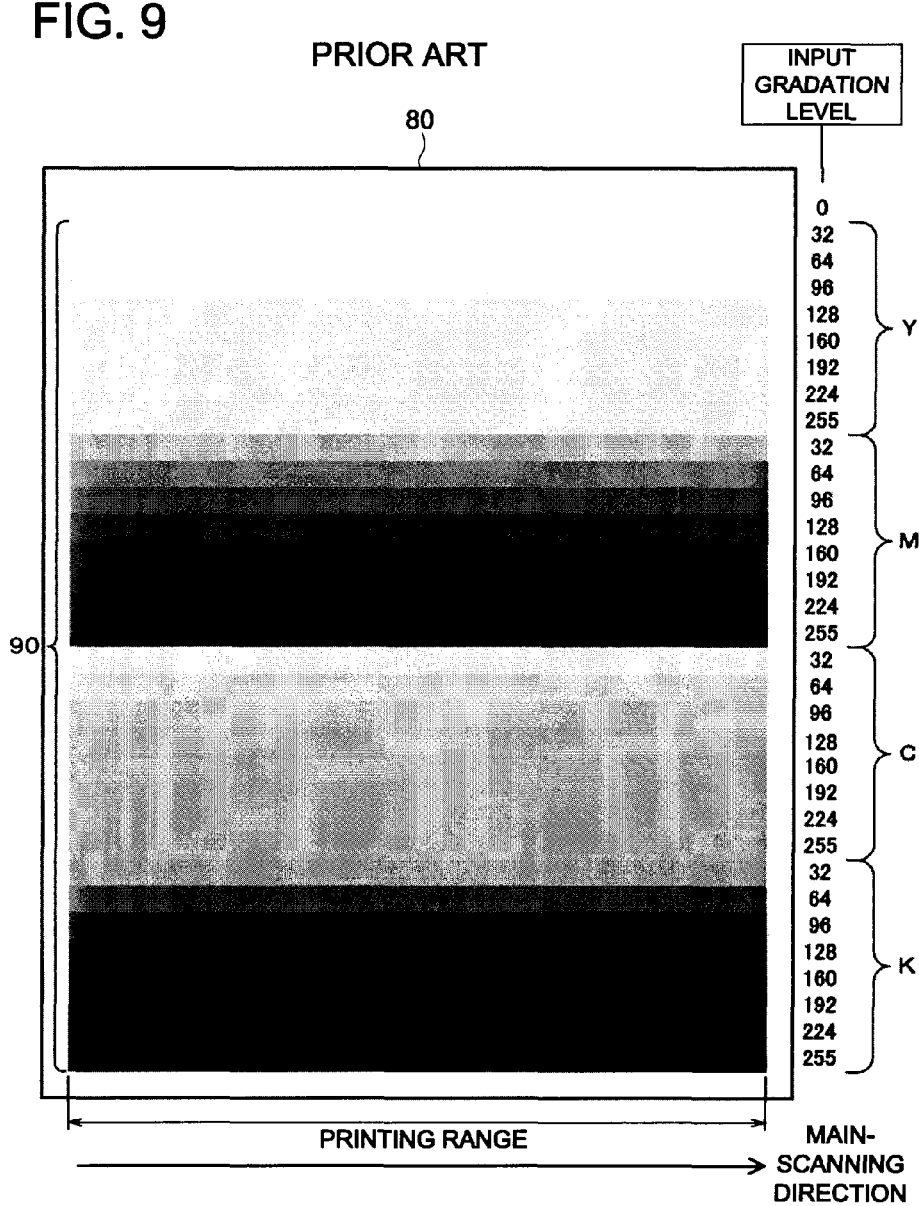
FIG. 9 shows a schematic diagram indicating an example of a conventional test chart to be employed for measuring and correcting density unevenness in a main-scanning direction.

Compared to the detailed test chart 80 shown in FIG. 9, the simple test chart 60a above-exemplified can be printed onto the recording medium being smaller than ever, and an amount of toner consumption is also smaller than ever. Further, since the number of patch images to be measured is small, the time required for measuring the density can be shortened.

The user employs the measuring apparatus 40 for measuring the density unevenness of each of the patch images 70 printed on the simple test chart 60a in the main-scanning direction. Receiving the measured data inputted by the measuring apparatus 40 as the result of the abovementioned measuring operation, the image processing apparatus 50 calculates the correction values for correcting the density unevenness from the measured data concerned, for every main-scanning position of each of colors Y, M, C and K. With respect to gradation levels for which the measuring operation has not conducted, the image processing apparatus 50 performs the linear interpolation arithmetic calculation so as to find correction values for them from the above-calculated correction values of the measured gradation levels.

On the next occasion or the following occasion when outputting the simple test chart, the image processing apparatus 50 compares the density unevenness in the main-scanning direction, with respect to the adjacent patch images 70 having the same color and derived flow the measured data in the simple test chart previously outputted, so as to determine the patch images to be included in the simple test chart, which should be outputted at this time, based on the results of the above comparing operations. In this determining operation, the image processing apparatus 50 changes the number of patch images (increase/decrease of number of patch images), and/or change the gradation values of the patch images concerned.

Figure 6:
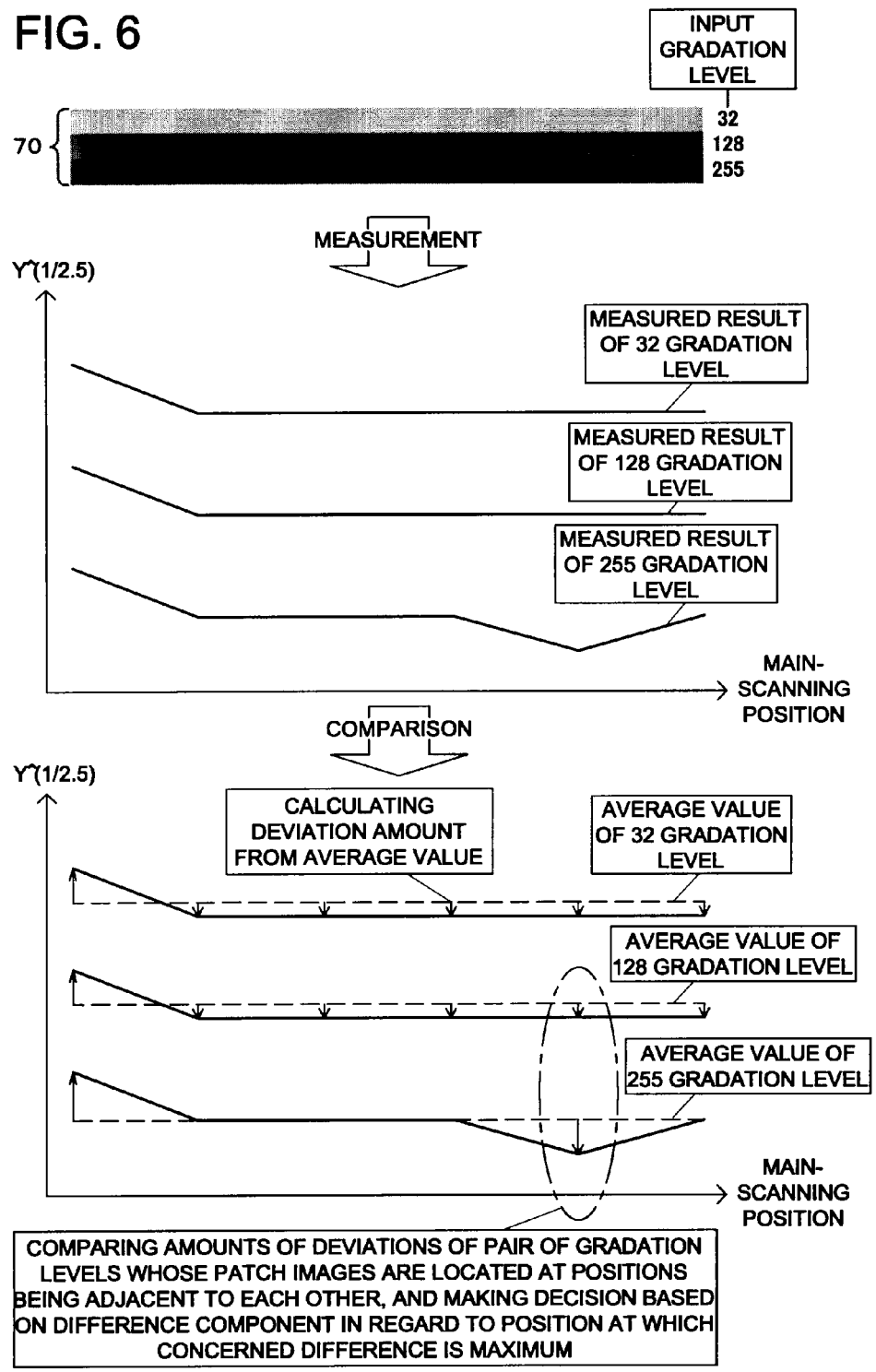
FIG. 6 shows a schematic diagram and graphs indicating an exemplified method for comparing density unevenness in a main-scanning direction between adjacent patch images, when determining patch images to be included in a simple test chart.

FIG. 6 shows a schematic diagram and graphs indicating an exemplified method for comparing the density unevenness in the main-scanning direction between the adjacent patch images, when determining the patch images to be included in the simple test chart. In this example, values, which are derived by multiplying the tristimulus values X, Y, Z by 1/2.5, are handled as the measured values.

At first, with respect to each of the gradation levels above-measured, the image processing apparatus 50 finds an average value of the measured values at each of the main-scanning positions, and calculates amounts of deviations between the average value and the measured values at each of the main-scanning positions, while taking the positive or negative aspect of the calculated amounts of deviations into account Successively, the image processing apparatus 50 compares the amounts of deviations of a first gradation level with those of a second gradation level whose value is most approximate to that of the first gradation level (in the present embodiment, the first and second gradation levels are equivalent to a pair of gradation levels whose patch images are located at positions being adjacent to each other) at the same main-scanning position (amounts of deviations between the average value and the measured values at the main-scanning positions), so as to find a specific main-scanning position at which the amount of deviation is maximum. The image processing apparatus 50 determines the increase/decrease of the number of patch images, etc., corresponding to the maximum value of the difference between the amounts of deviations represented by this position.

In the example shown in FIG. 6, when determining that the maximum value of the difference between the amounts of deviations is sufficiently small as a result of comparing those of the 32 gradation level and the 128 gradation level with each other (for instance, smaller than 0.01, as a value of $XYZ\textasciicircum1/$ 2.5), the image processing apparatus 50 can determine that the density unevenness of the 32 gradation level and the 128 gradation level in the main-scanning direction are the same as each other. Accordingly, since it is possible to approximate the correction value with a nearly equal value, the image processing apparatus 50 decreases (omits) one of the patch images of them.

Further, when determining that the maximum value of the difference between the amounts of deviations is great as a result of comparing those of the 128 gradation level and the 255 gradation level with each other (for instance, equal to or greater than 0.05, as a value of XYZ^1/2.5), the image processing apparatus 50 inserts a new patch image between those of the 128 gradation level and the 255 gradation level so as to increase the number of patch images, in order to make it possible to measure the density unevenness of the gradation level between them finer than ever.

Still further, when determining that the maximum value of the difference between the amounts of deviations is in a predetermined range (for instance, equal to or greater than 0.01 and smaller than 0.05, as a value of XYZ^1/2.5), the image processing apparatus 50 keeps the patch images of both gradation levels as it is, so that no increase/decrease processing is applied to those patch images.

Hereinafter, the value of 0.01, exemplified in the foregoing, is defined as a first threshold value (represented by "S1"), while, the value of 0.05 is defined as a second threshold value (represented by "S2"). In the present embodiment, corresponding to the maximum value of the difference between the amounts of deviations (represented by "T" the number of patch images is made to increase, decrease, or be kept invariant as follows.
(1) T<S1 ⇒ number of patch images•"DECREASE"
(2) T≥S2 ⇒ number of patch images•"INCREASE"
(3) S1≤T<S2 ⇒ number of patch images•"INVARIANCE"

Further, in the case of reducing the number of patch images, for instance, when the tendencies of the density unevenness in the main-scanning direction at the 32 gradation level, the 128 gradation level and the 255 gradation level are the same as each other, and accordingly, any one of them is made to remain as it is, it is preferable that a gradation value near the center value (in this example, the 128 gradation level) is made to remain, or a gradation value representing fainter gradation (color) (in this example, the 32 gradation level) is made to remain. When the gradation value near the center value is made to remain, it is possible to measure the density unevenness having the tendency approximate to those of gradation values located at both sides of the gradation value concerned (in this example, the 32 gradation level and the 255 gradation level). On the other hand, when the gradation value representing fainter gradation (color) is made to remain, it is possible to reduce an amount of toner consumption, compared to such a case that a gradation value representing denser gradation (color) is made to remain.

Still further, in the case of increasing the number of patch images, it is applicable that the number of patch images is limited to such a number that is equal to or smaller than a predetermined number. For instance, it is applicable that the number of patch images is kept at a number that is equal to or smaller than the number of patch images indicated in the default simple test chart 60*a* shown in FIG. 5, or the other number of patch images indicated in the conventional test chart 80.

Figure 7:
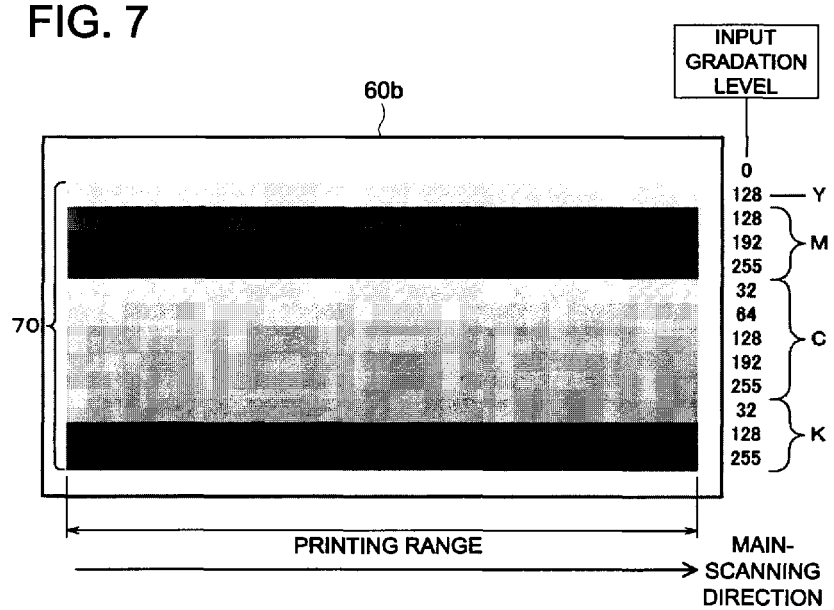
FIG. 7 shows a schematic diagram indicating another example of a simple test chart embodied in the present invention.

FIG. 7 shows a schematic diagram indicating an example of a newly-created (updated) simple test chart 60*b*. The simple test chart 60*b* exemplified in the present embodiment is updated from the default simple test chart 60*a* on the points that: in regard to color Y, the patch images 70 of the 32 gradation level and the 255 gradation level are omitted from those of color Y, while, only the patch image 70 of the 128 gradation level is made to remain; in regard to color M, the patch image 70 of the 32 gradation level is omitted, while, the patch images 70 of the 128 gradation level and the 255 gradation level are made to remain and the patch image 70 of the 192 gradation level is inserted between them so as to increase the number of patch images; in regard to color C, the patch images 70 of the 32 gradation level and the 128 gradation level are made to remain and the patch image 70 of the 64 gradation level is inserted between them so as to increase the number of patch images, while, the patch images 70 of the 128 gradation level and the 255 gradation level are made to remain and the patch image 70 of the 192 gradation level is inserted between them so as to increase the number of patch images; and, in regard to color K, the original patch images 70 of the 32 gradation level, the 128 gradation level and the 255 gradation level are made to remain. In this connection, 12 patch images 70, number of which is same as the number of patch images 70 printed on the default simple test chart 60*a*, are also printed on the simple test chart 60*b* exemplified in the present embodiment.

As described in the foregoing, by determining the patch images to be included in the next simple test chart to be employed for the next measurement, based on the state of density unevenness in the main-scanning direction, measured by employing the previous simple test chart 60*a*, it becomes possible to appropriately correct the density unevenness in the main-scanning direction in regard to greater number of gradation levels than ever, even if a small number of patch images (gradation levels) is employed. Further, even if the data for every gradation level is short, with respect to the correctable color, a small number of patch images is required for completing the measuring operation, and, as that share, it becomes possible to increase the number of patch images in regard to a color for which the data for every gradation level is necessary.

Further, sometimes, the density unevenness in the main-scanning direction would change due to various kinds of factors, such as an increase of a number of paper sheets to be printed, time-dependent changes of parts (deteriorations or changes of characteristics of the parts concerned, etc.), an operation for changing parts, etc. To cope with such the problem as abovementioned, it is applicable that the system is so constituted that, when the simple test chart is outputted at the next output timing after the number of printed paper sheets (counted value of the print counter) has exceeded a predetermined value, or at the other next output timing after the main power switch has been turned OFF or the apparatus door has been opened, etc., the default simple test chart 60*a* is outputted.

Next, the operations to be conducted in the image processing system 5 will be detailed in the following.

Figure 8:
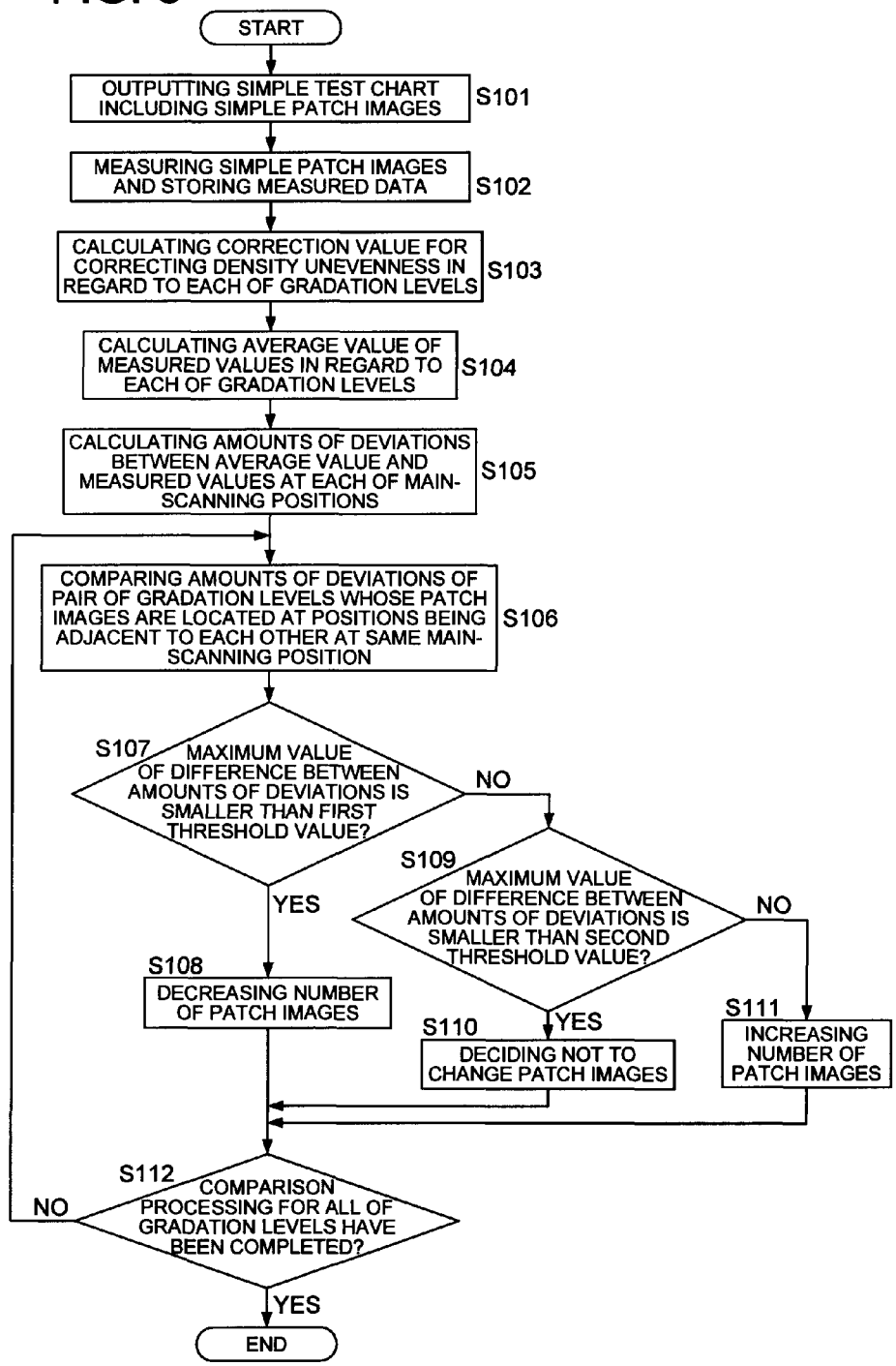
FIG. 8 shows a flowchart indicating a flow of operations to be conducted in an image processing system embodied in the present invention.

FIG. 8 shows a flowchart indicating a flow of operations to be conducted in the image processing system 5. The flow of operations is commenced at the time when the operator, such as a user, a manager, etc., inputs (issues) an instruction for outputting the simple test chart (simple patch images) into the printing apparatus 10. In this connection, hereinafter, it is assumed that the image processing apparatus 50 stores the image data of the default simple test chart (refer to the schematic diagram shown in FIG. 5) in advance into the nonvolatile storage section 54.

Receiving the instruction for outputting the simple test chart (simple patch images) through the operating section 17, the printing apparatus 10 transmits the instruction for outputting the simple test chart to the image processing apparatus 50. Receiving the instruction concerned at the first time, the image processing apparatus 50 reads out the image data representing the default simple test chart stored in the nonvolatile storage section 54 so as to output the concerned image data to the printing apparatus 10. Successively, based on the image data inputted from the image processing apparatus 50, the printing apparatus 10 prints the simple test chart (simple patch images) onto the recording medium to output the printed recording medium (Step S101).

Receiving the above-printed recording medium, the user employs the measuring apparatus 40 to measure the density unevenness in the main-scanning direction in regard to each of the patch images (patch image corresponding to each of the gradation levels of colors Y, M, C and K) included in the simple test chart printed on the recording medium outputted by the printing apparatus 10. Then, the measuring apparatus 40 transmits the measured data (measured value), acquired by the above measuring operation, to the image processing apparatus 50, so that the image processing apparatus 50 stores the measured data received from the measuring apparatus 40 into the nonvolatile storage section 54 (Step S102).

Successively, based on the measured data above-received, the image processing apparatus 50 calculates the correction value for correcting the density unevenness in the main-scanning direction in regard to each of the gradation levels of colors Y, M, C and K. With respect to gradation levels for which the measuring operation has not conducted, the image processing apparatus 50 performs the linear interpolation arithmetic calculation so as to find correction values for them from the above-calculated correction values of the measured gradation levels (Step S103).

Still successively, the image processing apparatus 50 stores the above-calculated correction values into the nonvolatile storage section 54, so that, when the terminal device 30 requests the printing apparatus 10 to conduct the printing operation, the image processing apparatus 50 employs the stored correction values for correcting the print data (image data) to be transmitted from the terminal device 30 to the printing apparatus 10 through the image processing apparatus 50.

Still successively, the image processing apparatus 50 calculates an average value of the measured values at each of the main-scanning positions, for every gradation level included in the measured data (Step S104), and calculates amounts of deviations between the average value and the measured values at each of the main-scanning positions (Step S105). Then, the image processing apparatus 50 compares the amounts of deviations of a first gradation level with those of a second gradation level whose value is most approximate to that of the first gradation level (in the present embodiment, the first and second gradation levels are equivalent to a pair of gradation levels whose patch images are located at positions being adjacent to each other) at the same main-scanning position (amounts of deviations between the average value and the measured values at the main-scanning positions), so as to find a specific main-scanning position at which the amount of deviation is maximum (Step S106).

Still successively, when determining that the maximum value of the difference between the amounts of deviations is smaller than the first threshold value (for instance, 0.01, as a value of XYZ^1/2.5) (Step S107; Yes), the image processing apparatus 50 decides to decrease the number of the patch images concerned (Step S108). When determining that the maximum value of the difference between the amounts of deviations is equal to or greater than the first threshold value (Step S107; No) and smaller than the second threshold value (for instance, 0.05, as a value of XYZ^1/2.5) (Step S109; Yes), the image processing apparatus 50 decides not to change the patch images (Step S110). When determining that the maximum value of the difference between the amounts of deviations is greater than the second threshold value (Step S109; No), the image processing apparatus 50 decides to increase the number of patch images (Step S111). The detailed method for conducting the patch image increase/decrease processing has been described in the foregoing.

Yet successively, when determining that the comparison processing for all of the gradation levels have not been completed (Step S112; No), the image processing apparatus 50 returns to Step S106 so as to repeat the processing from Step S106 to the following steps as well. When determining that the comparison processing for all of the gradation levels have been completed (Step S112; Yes), the image processing apparatus 50 finalizes the processing (END).

In this connection, in the case that the number of patch images has decreased in Step S108 or has increased in Step S111, and accordingly, the previously-outputted simple test chart has updated to the new one, the image processing apparatus 50 creates the image data representing the above-updated simple test chart, and stores the created image data into the nonvolatile storage section 54. Then, at the next time when receiving the instruction for requesting the simple test chart from the printing apparatus 10, the image processing apparatus 50 transmits the concerned image data representing the simple test chart to the printing apparatus 10.

Further, it is applicable that the newly created image data is stored into a storage device ac cu or the newly created image data, other than the default simple test chart, is stored in an overwriting save mode (updating mode). Further, in any one of the abovementioned cases, it is also applicable that other image data, which represents the other simple test chart and have been newly stored, is deleted (reset) at the time when the default simple test chart is outputted, other than at the first time.

As described in the foregoing, flour the result of measuring the density of each of the patch images printed in the simple test chart by the printing apparatus 10, the image processing apparatus 50 compares the density unevenness in the main-scanning direction in regard to the pair of patch images located at such the positions that are adjacent to each other in the simple test chart concerned, so as to determines the patch images to be included in the data representing the updated simple test chart to be outputted at the next time, based on the above-comparison result. According to the abovementioned, it becomes possible to include an appropriate number of patch images, having appropriate gradation values, into the data representing the simple test chart to be outputted at the next time, while securing the accuracy of the correction. Accordingly, it becomes possible to conduct the operation for correcting the density unevenness in the main-scanning direction of the image, which is to be printed by the printing apparatus 10, while achieving both the accuracy and the efficiency thereof. Specifically, with respect to the efficiency, it becomes possible not only to save amounts of toner and paper sheets to be consumed at the time when the test chart 60 is printed, but also to shorten the time required for measuring the densities in regard to the patch images 70 included in the test chart 60.

Referring to the drawings, the embodiment of the present invention has been described in the foregoing. However, the scope of the present invention is not limited to the embodiment exemplified in the foregoing. Modifications and/or additions, made by a skilled person without departing from the spirit and scope of the invention, shall be included in the scope of the present invention.

For instance, although the image processing apparatus 50 and the printing apparatus 10 are separately included in the image processing system 5 in the aforementioned embodiment, it is needless to say that the system can be so constituted that the image processing apparatus 50 is integrated into the printing apparatus 10. Further, it is also applicable that the system is so constituted that, by giving the same function as that of the measuring apparatus 40 (spectrum analyzer), as described in the aforementioned embodiment, to the scanner section 20 provided in the printing apparatus 10, the function of the measuring apparatus 40 is integrated into the printing apparatus 10.

Further, with respect to the determining method (image processing method) to be employed at the time when the density unevenness in the main-scanning direction are compared in regard to the pair of patch images located at the positions being adjacent to each other and included in the test chart (simple test chart) printed by the printing apparatus 10, and then, based on the comparison result concerned, the patch images to be included into the data representing the simple test chart to be outputted at the next time, the scope of the present invention is not limited to that described in the present embodiment.

For instance, it is applicable to change the gradation level of the patch image to be included into the data representing the test chart to be outputted at the next time. Although the aforementioned embodiment of the present invention is so constituted that, when determining that the maximum value of the difference between the amounts of deviations of the density unevenness in regard to the pair of patches whose gradation levels being adjacent to each other is equal to or greater than the first threshold value and smaller than the second threshold value, the image processing apparatus 50 decides not to change the patch images, it is also applicable that, for instance, the system is so constituted that, even if the concerned maximum value is in the abovementioned range, the gradation levels of the patches are to be changed, corresponding to the amplitude of the maximum value of the difference between the amounts of deviations of the density unevenness. Concretely speaking, in regard to the three patches of the 32 gradation level, the 128 gradation level and the 255 gradation level, even if the maximum value of the difference between the amounts of deviations of the density unevenness in regard to the pair of patches whose gradation levels being adjacent to each other is equal to or greater than the first threshold value and smaller than the second threshold value, when the maximum value of the difference between the amounts of the deviations of the 128 gradation level and the 255 gradation level is greater than that of the 32 gradation level and the 128 gradation level, the image processing apparatus 50 shifts the 128 gradation level near to the 255 gradation level, for instance, shifts the 128 gradation level to the 160 gradation level or the 192 gradation level so as to replace the 128 gradation level with the 160 gradation level or the 192 gradation level, etc.

Further, it is also applicable that, when the characteristic differences of the density unevenness in the main-scanning direction between any pair of patches included in the a plurality of patches, whose gradation levels are continuously adjacent to each other, fall within the first allowable range, specific patches, a number of which is smaller than that of the plurality of patches, are included in next data of the nest test chart to be outputted on the next occasion, as the patches representing the gradation range from the maximum to the minimum gradation values among the plurality of patches. Further, in this case, it is also applicable that one of the patches, the number of which is smaller than that of the plurality of patches, is made to be set as such a patch that is located near to the center position within the gradation range from the maximum to the minimum gradation values, or a patch whose gradation value is located near to the minimum gradation value at the low density side is included in the patches, the number of which is smaller than that of the plurality of patches.

Concretely speaking, in regard to the three patches of the 32 gradation level, the 64 gradation level and the 128 gradation level, when one of the patches in a range of 32-128 gradation levels is made to be included into the data of the test chart to be outputted at the next time, it is applicable that one of the patches is determined as either the 64 gradation level located near the center, or the 32 gradation level of the minimum gradation value.

Still further, when tow patches extracted from the abovementioned range are made to be included into the data of the test chart to be outputted at the next time, it is applicable that the patches of the 48 gradation level and the 96 gradation level are determined or the other patches of the 32 gradation level and the 80 gradation level are determined. In other words, when "N" (N≥2) patches extracted from the gradation range of the maximum–minimum gradation values are made to be included into the data of the test chart to be outputted at the next time, it is applicable that the patches, whose gradation range is equally divided into (N+1), are determined as the concerned patches to be included, or the other patches, whose gradation range is equally divided into N by excluding the patch of the minimum gradation value.

Yet further, the scope of the printing apparatus, embodied in the present invention, is not limited to the MFP (Multi-Functional Peripherals), but shall include a printer, a copier, etc.

According to an image processing apparatus, a printing apparatus and an image processing method, each embodied in the present invention, it becomes possible to conduct an operation for correcting density unevenness in a main-scanning direction of an image, which is to be printed onto a recording medium, while achieving both the accuracy and the efficiency thereof.

While the preferred embodiments of the present invention have been described using specific term, such description is for illustrative purpose only, and it is to be understood that changes and variations may be made without departing from the spirit and scope of the appended claims.

What is claimed is:

1. An image processing apparatus that outputs data representing a test chart to be used for measuring density unevenness in a main-scanning direction, which is included in an image printed by a printing apparatus, comprising:
    an outputting section to output the data representing the test chart that includes a plurality of patches respectively having gradation values, which are different from each other, and each of which is extended in the main-scanning direction;
    an acquiring section to acquire a measured result of measuring a density of each of the patches included in the test chart printed by the printing apparatus based on the data outputted by the outputting section; and
    a control section to compare in the main-scanning direction the density unevenness of a pair of patches being adjacent to each other among the plurality of patches, wherein the density unevenness of the pair of patches are derived from the measured result acquired by the acquiring section, and to determine new data representing a next patch to be outputted on a next occasion, based on the comparison result, wherein, when characteristic differences of the density unevenness in the main-scanning direction between any pair of patches included in the plurality of patches, whose gradation values are continuously adjacent to each other, fall within a first allowable range, the control section to include specific patches, a number of which is smaller than that of the plurality of patches, into next data representing a next test chart to be outputted on a next occasion, as patches representing a gradation range from a maximum to a minimum gradation values among the plurality of patches; or, wherein, when characteristic differences of the density unevenness in the main-scanning direction between any pair of patches included in the plurality of patches exceed a second allowable range, the control section to include each of the patches, whose gradation levels are adjacent to each other, into next data representing a next test chart to be outputted on a next occasion; or, wherein, when a characteristic difference of the density unevenness in the main-scanning direction between a pair of patches included in the plurality of patches exceeds a third allowable range, the control section to add a new patch, having such a gradation value that is an intermediate value between gradation values of the pair of patches, into next data representing a next test chart to be outputted on a next occasion.

2. The image processing apparatus of claim 1, wherein, based on the comparison result, the control section changes a gradation value of at least of one of the patches and/or a number of patches to be included in the test chart.

3. The image processing apparatus of claim 1, wherein, in a case where characteristic differences of the density unevenness in the main-scanning direction between any pair of patches included in the plurality of patches, whose gradation values are continuously adjacent to each other, fall within the first allowable range, the control section establishes one of the specific patches, the number of which is smaller than that of the plurality of patches, as such a patch that is located near to a center position within the gradation range from the maximum to the minimum gradation values.

4. The image processing apparatus of claim 1, wherein, in a case where characteristic differences of the density unevenness in the main-scanning direction between any pair of patches included in the plurality of patches, whose gradation values are continuously adjacent to each other, fail within the first allowable range, the control section includes a patch, whose gradation value is located near to the minimum gradation value at a low density side, into the specific patches, the number of which is smaller than that of the plurality of patches.

5. The image processing apparatus of claim 1, wherein, in a case where characteristic differences of the density unevenness in the main-scanning direction between any pair of patches included in the plurality of patches, whose gradation values are continuously adjacent to each other, fall within the first allowable range, the control section establishes the number of the specific patches, which is smaller than that of the plurality of patches, at one.

6. The image processing apparatus of claim 1, wherein the control section limits the number of patches to be included in the test chart to such a number that is equal to or smaller than a constant numeral.

7. The image processing apparatus of claim 1, further comprising:
a correcting section that finds a correction value for correcting the density unevenness in the main-scanning direction, based on the measured result acquired by the acquiring section, so as to employ the correction value to correct image data.

8. A printing apparatus, comprising:
a printing section to repeatedly form one line image in a main-scanning direction onto a recording medium, to incrementally move the recording medium in a sub-scanning direction being orthogonal to the main-scanning direction to sequentially sift a recording position of the one line image one by one, and to form a two dimensional image onto the recording medium; and
an image processing device to output data representing a test chart to be used for measuring density unevenness of the two dimensional image in the main-scanning direction, which is to be formed by the printing section;
wherein the image processing device comprises:
an outputting section to output the data representing the test chart that includes a plurality of patches respectively having gradation values, which are different from each other, and each of which is extended in the main-scanning direction;
an acquiring section to acquire a measured result of measuring a density of each of the patches included in the test chart printed by the printing apparatus based on the data outputted by the outputting section; and
a control section to compare in the main-scanning direction the density unevenness of a pair of patches being adjacent to each other among the plurality of patches, wherein the density unevenness of the pair of patches are derived from the measured result acquired by the acquiring section, and to determine new data representing a next patch to be outputted on a next occasion, based on the comparison result, wherein, when characteristic differences of the density unevenness in the main-scanning direction between any pair of patches included in the plurality of patches, whose gradation values are continuously adjacent to each other, fall within a first allowable range, the control section to include specific patches, a number of which is smaller than that of the plurality of patches, into next data representing a next test chart to be outputted on a next occasion, as patches representing a gradation range from dm mum to a minimum gradation values among the plurality of patches; or, wherein, when characteristic differences of the density unevenness in the main-scanning direction between any pair of patches included in the plurality of patches exceed a second allowable range, the control section to include each of the patches, whose gradation levels are adjacent to each other, into next data representing a next test chart to be outputted on a next occasion; or, wherein, when a characteristic difference of the density unevenness in the main-scanning direction between a pair of patches included in the plurality of patches exceeds a third allowable range, the control section to add a new patch, having such a gradation value that is an intermediate value between gradation values of the pair of patches, into next data representing a next test chart to be outputted on a next occasion.

9. An image processing method that is to be implemented in an information processing apparatus, comprising:
outputting data representing a test chart to be used for measuring density unevenness in a main-scanning direction, which is included in an image printed by a printing apparatus, wherein the test chart includes a plurality of patches respectively having gradation values, which are different from each other, and each of which is kept constant in the main-scanning direction;

acquiring a measured result of measuring a density of each of the patches included in the test chart printed by the printing apparatus based on the data outputted in the outputting step;

comparing in the main-scanning direction the density unevenness of a pair of patches being adjacent to each other among the plurality of patches, wherein the density unevenness of the pair of patches are derived from the measured result acquired in the acquiring step; and determining one or more patches to be included in new data of a next test chart to be outputted on a next occasion, based on a comparison result outputted in the comparing step;

wherein, in the determining step, when characteristic differences of the density unevenness in the main-scanning direction between any pair of patches included in the plurality of patches, whose gradation values are continuously adjacent to each other, fall within a first allowable range, specific patches, a number of which is smaller than that of the plurality of patches, are included into the new data for the next test chart, as patches representing a gradation range from a maximum to a minimum gradation values among the plurality of patches; or, wherein, in the determining step, when characteristic differences of the density unevenness in the main-scanning direction between any pair of patches included in the plurality of patches exceed a second allowable range, each of the patches, whose gradation levels are adjacent to each other, is included into the new data for the next test chart; or, wherein, in the determining step, when a characteristic difference of the density unevenness in the main-scanning direction between a pair of patches included in the plurality of patches exceeds a third allowable range, a new patch, having such a gradation value that is an intermediate value between gradation values of the pair of patches, is added to the new data for the next test chart.

\* \* \* \* \*